United States Patent [19]

Abolins

[11] 4,199,297
[45] Apr. 22, 1980

[54] VEHICLE FOR TRANSPORTING COMPRESSIBLE MATERIALS

[75] Inventor: Andrew Abolins, Langhorne, Pa.

[73] Assignee: Strick Corporation, Fort Washington, Pa.

[21] Appl. No.: 890,546

[22] Filed: Mar. 20, 1978

[51] Int. Cl.² .............................................. B60P 1/00
[52] U.S. Cl. .............................. 414/525 R; 100/278
[58] Field of Search .............. 414/475, 492, 509, 679, 414/514, 521, 525; 100/278, 35; 53/523, 527, 529

[56] References Cited

U.S. PATENT DOCUMENTS

| | | | |
|---|---|---|---|
| 2,318,886 | 5/1943 | Paiement | 414/516 |
| 2,909,295 | 10/1959 | Weir | 414/515 |
| 3,342,354 | 9/1967 | Behr | 414/521 |
| 3,722,717 | 3/1973 | Stryczek | 414/521 |
| 3,741,416 | 6/1973 | Bilbow | 414/525 |
| 3,796,330 | 3/1974 | Dehner | 414/525 |
| 3,838,782 | 10/1974 | Gammill, Jr. | 414/525 |
| 4,004,703 | 1/1977 | Johnson, Jr. | 414/679 |
| 4,078,682 | 3/1978 | Johnson, Jr. | 414/525 |

*Primary Examiner*—Lawrence J. Oresky
*Attorney, Agent, or Firm*—Seidel, Gonda, Goldhammer & Panitch

[57] ABSTRACT

A trailer van is adapted to load compressible materials in sequential steps resulting in a compressed product load. The product is compressed by a bulkhead which in turn is moved by a pair of wheeled trolleys. A separate pair of cables is associated with each trolley for stabilizing the trolleys in a vertical disposition.

10 Claims, 11 Drawing Figures

VEHICLE FOR TRANSPORTING COMPRESSIBLE MATERIALS

BACKGROUND

Vehicles of the type involved herein are classified in class 214, subclass 82 et seq. For relevant prior art, see U.S. Pat. Nos. 3,796,330 and 4,004,703. The vehicles disclosed in said patents suffer from one or more of the following disadvantages.

To ensure a vertical disposition and provide parallel guidance of the pushing means in said patents, synchronized chains or ropes are employed, which results in a very expensive and difficult to maintain arrangement. In U.S. Pat. No. 3,796,330, the arrangement creates a considerable reduction of cargo space which results in a loss of payload. Due to a moment arm affect wherein the prior pushing means tends to rotate about vertical axes, lateral connecting beams are provided to resist such rotation. One of said connecting beams is adjacent the floor and lift trucks must pass over the same when loading the vehicle.

The prior art vehicles due to their construction have control problems due to said wall bulge. It is difficult to have access to cables, chains and the like for maintenance purposes. The side walls of the vehicles have projections which rub against the compressible product thereby damaging the same. These and other disadvantages of the prior art are overcome by the present invention.

The structural strength of conventional, standard dry cargo semi-trailers is not sufficient to withstand the loads imposed upon them by these loading systems. Consequently, specially engineered and constructed trailers must be used, resulting in a much higher cost. In other words, these loading systems cannot be economically added to standard construction semi-trailers.

The system described in U.S. Pat. No. 4,004,703 has one major drawback. The "pushing means" (or, in this case, it would actually be "pulling means") have no mechanical, built-in provision for returning to the open (rear) end of the trailer enclosure to receive the next load and to perform another loading (compression) cycle. The "pull cables" must be returned to the rear by hand (impossible due to the resisting forces involved) or by some mechanical device such as forklift truck dragging them out. The basic problem, of course, is that the actuating mechanism, block-and-tackle, is a "one way motion" device. It can pull ropes or cables, but it cannot push them back.

SUMMARY OF THE INVENTION

A vehicle for transporting compressible materials includes a standard enclosure having two side walls, a top wall, a bottom wall, a loading end, and a closed end. A bulkhead is disposed transversely in said enclosure. The bulkhead has means thereon to facilitate securement of the bulkhead at various locations in the enclosure.

A pair of wheeled trolleys are provided within the enclosure. Each trolley is connected to discrete loop arrangement for moving the trolleys longitudinally along the side walls. Each loop arrangement is adjacent the intersection between a side wall and the bottom wall. The trolleys are disposed for pushing opposite ends of said bulkhead.

A stabilizing means including a separate pair of cables is associated with each trolley for stabilizing the trolleys in a vertical disposition. At least two pulleys on each trolley are in contact with each cable. Each cable extends along a side wall from a location adjacent the top wall at one of said ends to a location adjacent the bottom wall at the other of said ends.

It is an object of the present invention to provide a vehicle for transporting compressible materials which is compatible with fork lift loading trucks, has a stabilized structure for compressing a product load, wherein the system is not affected by side wall bulge, is capable of handling greater loads, while being simple and reliable.

Other objects will appear hereinafter.

For the purpose of illustrating the invention, there is shown in the drawings a form which is presently preferred; it being understood, however, that this invention is not limited to the precise arrangements and instrumentalities shown.

FIG. 5 is a partial perspective view of the loop arrangement at one end thereof.

Referring to the drawings in detail, wherein like numerals indicate like elements, there is shown in FIG. 1 a vehicle in the form of a trailer embodying the present invention and designated generally as 10.

Figure 1:
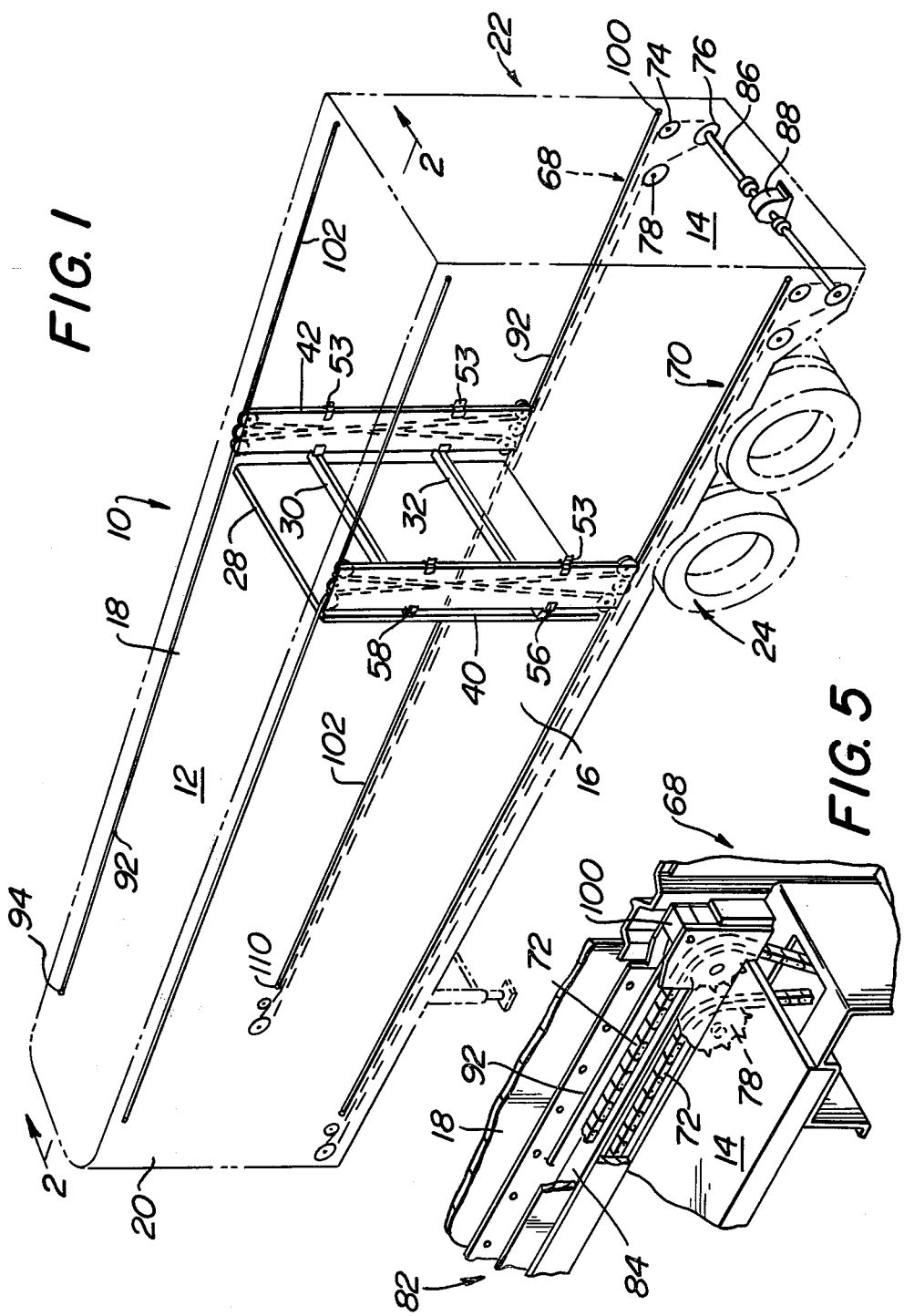
FIG. 1 is a diagrammatic perspective view of a vehicle in accordance with the present invention.

The trailer 10 is constructed of conventional materials and has a top wall 12, bottom wall 14, and longitudinally extending side walls 16, 18. The trailer has a loading end 22 and a closed end 20. As is conventional, the loading end 22 is provided with doors 26. The trailer is provided with a conventional wheeled chassis 24.

A bulkhead 28 extends transversely across the interior of the enclosure defined by the walls 12, 14, 16, 18. The bulkhead 28 is provided with transversely extending guide tubes 30 and 32 on the surface thereof facing the doors 26. The guide tubes 30, 32 strengthen the bulkhead 28 and perform additional functions as will be made clear hereinafter.

Figure 2:
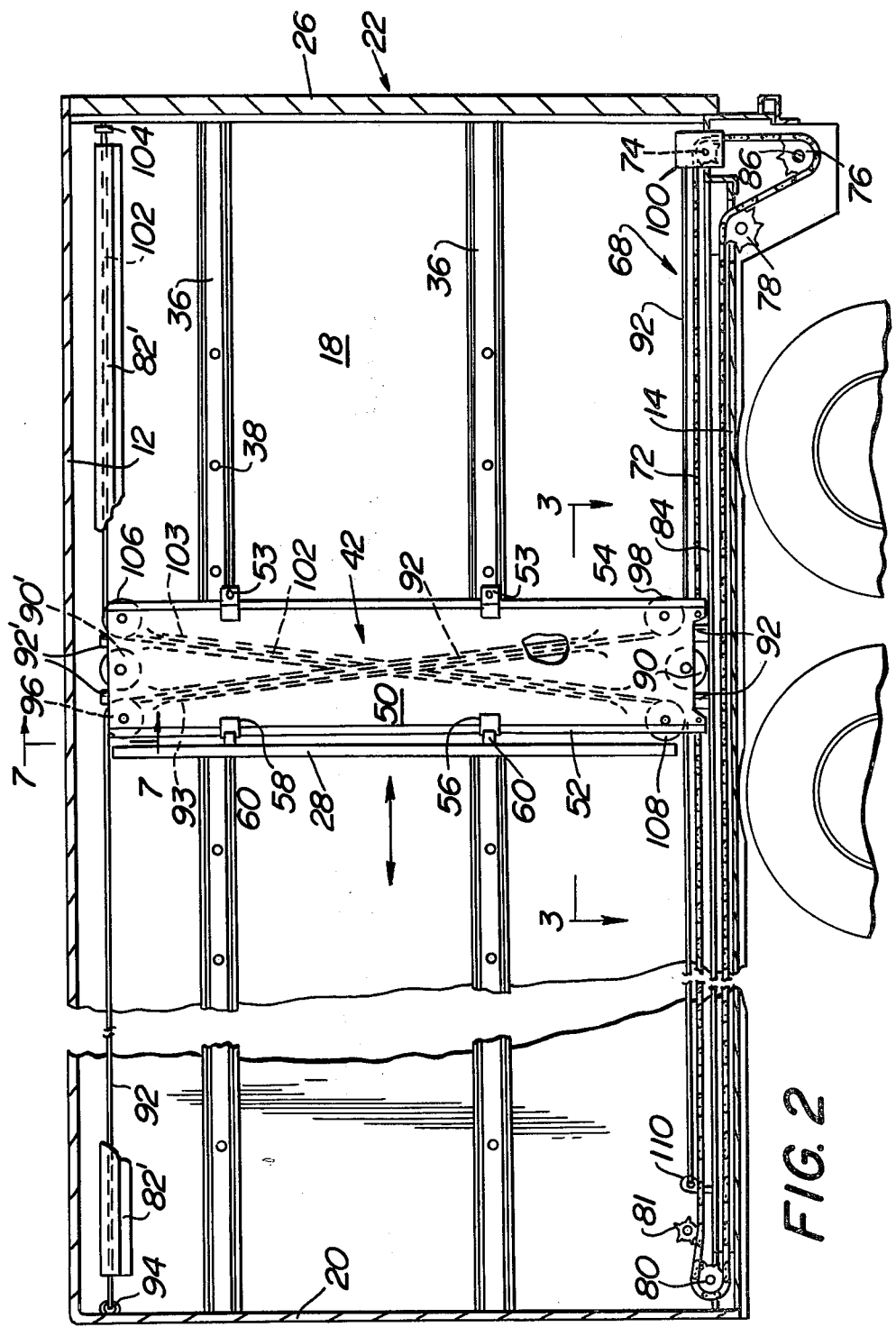
FIG. 2 is a sectional view taken along the lines 2—2 in FIG. 1.
Figure 4:
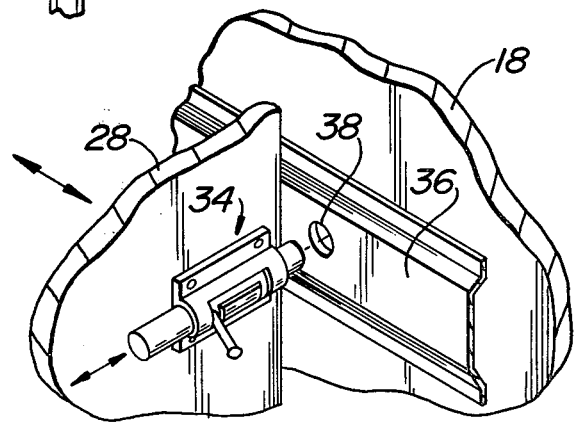
FIG. 4 is a partial perspective view showing a bulkhead and associated structure for securing a bulkhead to a side wall of the vehicle.

As shown more clearly in FIGS. 2 and 4, track members 36 are attached to the side wall 18 and extend longitudinally therealong. Similar track members are provided at the same elevation on side wall 16. The track members are provided with holes 38 at spaced points therealong. The bulkhead 28 has a latch 34 which includes a member selectively positioned in the holes 38. A latch 34 is provided at the same elevation of each of the track members 36.

To facilitate pushing of the bulkhead 28 to compress a product within the enclosure, there is provided a pair of trolleys 40, 42. The trolleys are identical. Hence, only trolley 42 will be described in detail. The trolleys 40, 42 are independent of one another and are not interconnected.

Figure 3:
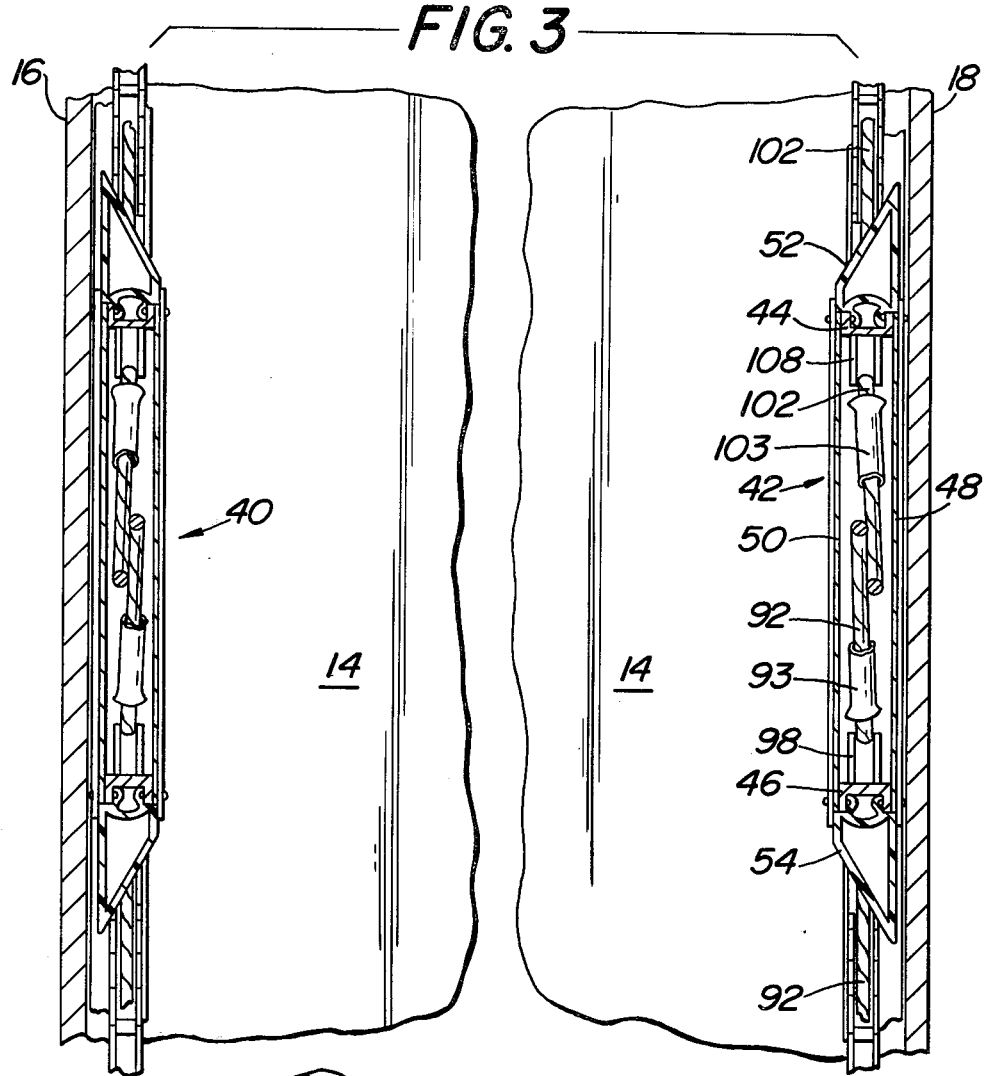
FIG. 3 is a sectional view taken along the lines 3—3 in FIG. 2.

Referring to FIGS. 2 and 3, trolley 42 includes an internal rectangular frame made of channel members. The vertically disposed channel members are identified as 44 and 46. Horizontally disposed reinforcements extending between the channels 44, 46 are not shown. The channel members are connected to side walls 48, 50 so as to define an enclosure open at the top and bottom ends thereof.

The vertically disposed channel member 46 has a plurality of deflectors 54 connected thereto with a snap fit. The deflectors 54 are made from a readily deformable plastic and are tapered along their length in a direction towards the adjacent side wall 18. The need for a plurality of deflectors 54 is occasioned by the provision of cable fitting 53.

Figure 6:
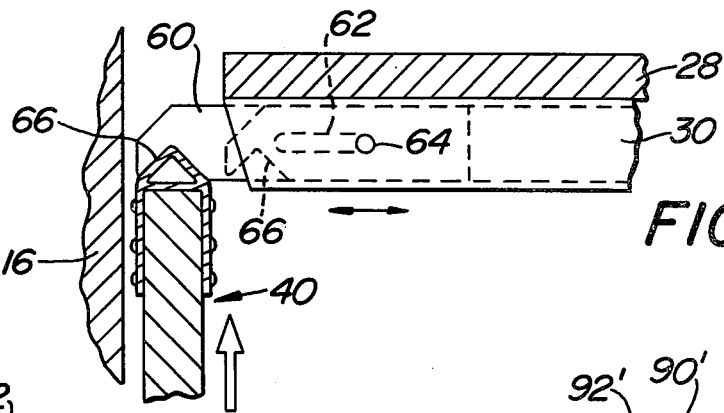
FIG. 6 is a sectional view of the front end of trolley and one end portion of a bulkhead.

The vertically disposed channel member 44 has a plurality of deflectors 52 snap-fit therein. The need for a plurality of deflectors 52 is occasioned by the fact that channel member 44 has projections 56 and 58 extending forwardly toward the bulkhead 28 thereby interrupting its front face. The projections 56, 58 engage the bulkhead 28 by way of the plungers 60 which are slideably received within each of the guide tubes 30, 32 at the ends thereof. See FIG. 6. Each plunger 60 has an elongated slot 62 through which extends a retainer pin 64. Each plunger 60 has a V-shaped notch 66 for engaging the mating V-shaped front edge of the projections 56, 58. In FIG. 6, the inoperative position of the plunger 60 is shown in phantom. The bulkhead 28 is supported by the floor 14 and to minimize friction is preferably equipped with two small wheels or castors on its lower edge.

Loop arrangements 68, 70 are provided adjacent the intersection of the bottom wall 14 and the side walls 18, 16, respectively. The loop arrangements are identical. Hence, only loop arrangement 68 will be described in detail.

Referring to FIG. 2, loop arrangement 68 is preferably a finite length of chain 72 having one end secured to one bottom end of the trolley 42. Chain 72 extends around sprockets 74, 76, 78, 80 and 81 and then is connected to the other bottom end of the trolley 42. A chain track 82 is bolted to the side wall 18 and has a horizontal divider wall 84. Wall 84 divides the track 82 into an upper track portion for the top run of chain 72 and a lower track portion for the bottom run of chain 72. Wall 84 provides an additional function set forth hereinafter.

Each sprocket 76 is connected to a discrete shaft 86. Each shaft is connected to one end of a double ended motor 88. See FIG. 1. Shaft 86 and motor 88 are below the elevation of the rear sill.

The trolley 42 has a wheel 90 at the lower end thereof which rides on the upper surface of wall 84. Trolley 42 is provided with side rollers 91 on opposite sides of the wheel 90. The rollers 91 fit between the vertically disposed portions of the chain track 82 for rolling contact therewith. A cable 92 has one end attached to an anchor 94. Anchor 94 is connected to the front wall 20 adjacent the intersection of the top wall 12 and side wall 18. See FIG. 2. Cable 92 extends parallel to the top wall 12 up to the trolley 42, and then enters the open upper end of the trolley 42. Within trolley 42, the cable 92 extends around idler pulley 96 adjacent the front end of the trolley 42 and then around an idler pulley 98. Pulley 98 is supported adjacent the lower end of the trolley 42 and adjacent the rear surface of the trolley 42. From pulley 98, the cable 92 exits from the open bottom end of the trolley 42 and then extends parallel to the bottom wall 14. The other end of the cable 92 is attached to an anchor 100. See FIG. 5.

A cable 102 has one end connected to an anchor 104. See FIG. 2. Anchor 104 is secured to the side wall 18 adjacent the intersecton of side wall 18 and top wall 12. Cable 102 extends into the trolley 42, around the pulleys 106, 108 and then extends parallel to the bottom wall 14 to the anchor 110. It will be noted that the cables 92, 102 criss-cross as they pass through the trolley 42. Cable 92 extends through a guide tube 93 and cable 102 extends through a guide tube 103. The guide tubes 93, 103 are built into the trolley 42 and perform a dual function. The guide tubes 93, 103 prevent chafing at the crossover point of cables 92, 102 and facilitate threading the cables through the trolley 92. The arrangement of the cables 92, 102 maintains the trolley 42 in a stabilized vertical disposition without interferring with the ability of the trolley 42 to reciprocate along the side wall 18.

Figure 7:
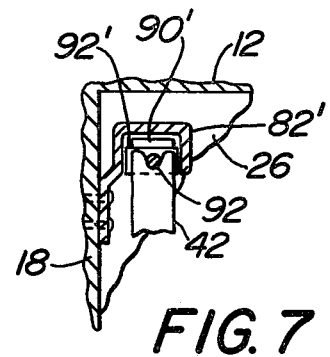
FIG. 7 is a sectional view taken along the line 7—7 in FIG. 2 and on an enlarged scale.
Figure 8:
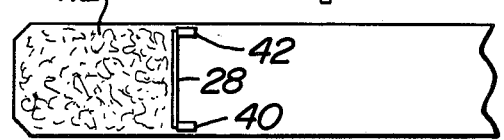
FIGS. 8-11 are progressive diagrammatic illustrations showing how a vehicle in accordance with the present invention is loaded with a compressible product.

The upper end of trolley 42 has side rollers 91' on opposite sides of a wheel 90'. The rollers 91' fit between the vertically disposed portions of track 82' mounted on the upper end of wall 18. See FIG. 7. Wheel 90' does not normally contact track 82'. The compression of certain materials occasionally generates an upward force at the face of bulkhead 28 which lifts the bulkhead 28 off the floor 14. Due to the high friction between plungers 60 and the projections 56, 58, such force tends to lift the trolleys 40, 42. If that should occur, wheel 90' contacts track 82' and rolls therealong. The horizontally disposed upper portions of cables 92, 102 are within track 82'.

The present invention is utilized as follows. Reference is made to FIGS. 8–11. A mass of compressible material 112, such as foam rubber buns, is placed in the front end of the enclosure. Bulkhead 28 is placed behind the material and the plungers 60 on the bulkhead 28 are moved to an operative position as shown in solid lines in FIG. 6 so as to be coupled to the trolleys 40, 42. Motor 88 rotates the shafts 86 so as to cause the loop arrangements 68, 70 to operate in synchronism whereby trolleys 40, 42 move forwardly and compress the material 112 whereby the components assume the position shown in FIG. 8.

Figure 9:
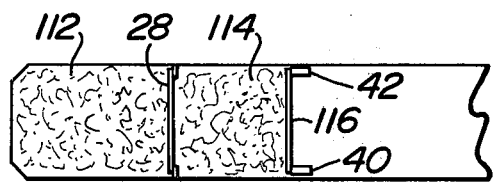
Figure 10:
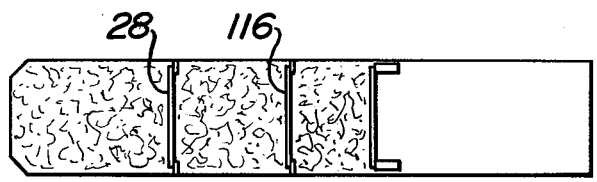

Thereafter, the bulkhead 28 is latched to the side walls 16, 18 by way of the most appropriate hole 38 on the track members 36. Thereafter, motor 88 is operated in reverse so as to retract the trolleys 40, 42. Another mass of compressible material 114 is placed in front of the trolleys. A new bulkhead 116 is placed behind the material 114 and then connected to the trolleys by way of plungers 60 as shown in FIG. 6. Thereafter, motor 88 is operated so as to move the trolleys 40, 42 forwardly in synchronization to compress material 114. Then bulkhead 116 is latched to the side walls 16 and 18. The trolleys 40, 42 are then retracted and the process repeated as shown in FIGS. 9 and 10.

Figure 11:
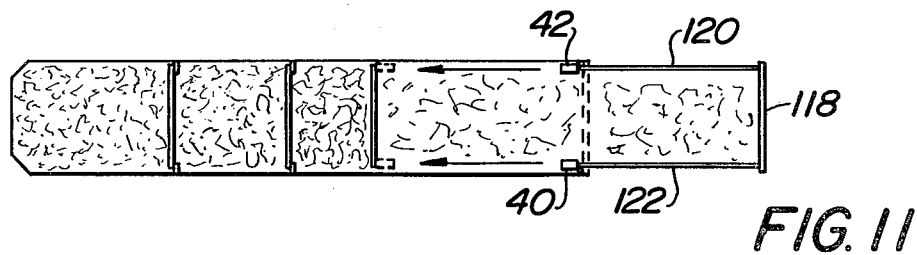

When the enclosure is substantially filled, the trolleys 40, 42 are retracted to their rearmost position as shown in FIG. 11. The remaining space within the enclosure is filled with compressible material. In addition, compressible material is supported outside the enclosure and between the rear end of the enclosure and bulkhead 118. Bulkhead 118 is connected to the fittings 53 on trolleys 40, 42 by cables 120, 122 or similar means. Thereafter, the trolleys 40, 42 are caused by motor 88 to move forwardly to compress all of the material until bulkhead 118 is disposed within the enclosure. Thereafter, the door means 26 at the rear end of the enclosure may be closed. Thus, it will be noted that the present invention enables all of the space within the enclosure to be loaded with compressed material whereas prior art devices have a space at the rear end of the enclosure that can carry uncompressed material only.

The chain 72 is reasonably protected from floor dirt while providing little or no problem for lubrication or other maintenance. Since the chain 72 extends to the front wall 20, it is possible to compress light density foam material to any compression ratio. Although isolated from contact with the foam material, the cables 92, 102 can be visually inspected througout their length for any sign of deterioration. Any forces tending to tilt the trolley 42 clockwise in FIG. 2 are stabilized by cable 92. Any forces tending to tilt the trolley 42 counterclockwise in FIG. 2 are stabilized by cable 102.

Since loads are applied in locations where a standard vehicle enclosure is well able to resist such loads, no reinforcement need be added to the vehicle enclosure. Since the trolley tracks 82 and 82' are anchored to the top and bottom corners, side wall bulge has little effect on the present invention and there are no projections on the side walls 16, 18 which can rub against the foam material and damage same.

The present invention may be embodied in other specific forms without departing from the spirit or essential attributes thereof and, accordingly, reference should be made to the appended claims, rather than to the foregoing specification as indicating the scope of the invention.

It is claimed:

1. A vehicle for transporting compressible materials comprising:
   (a) an enclosure having two side walls, a top wall, a bottom wall, a loading end, and a closed end,
   (b) a bulkhead positionable transversely across said enclosure and having means thereon to facilitate securing the bulkhead at various locations in said enclosure,
   (c) a pair of wheeled trolleys each connected to a discrete loop arrangement for moving the trolleys longitudinally along the side walls, each loop arrangement being adjacent the intersection between a side wall and the bottom wall, said trolleys being disposed for moving opposite ends of said bulkhead toward said closed end,
   (d) stabilizing means including a separate pair of cables associated with each trolley for stabilizing the trolleys in a vertical disposition, at least two discrete pulleys on each trolley in contact with each cable, each cable extending along a side wall from a location adjacent the top wall at one of said enclosure ends to a location adjacent the bottom wall at the opposite end of the enclosure,
   (e) a drive unit connected to each loop arrangement for driving them in synchronization.

2. A vehicle in accordance with claim 1 wherein said trolley pulleys are arranged so that said cables crisscross each other between the upper and lower ends of the trolleys.

3. A vehicle in accordance with claim 1 wherein said loop arrangement includes a chain of finite length having its ends connected to its associated trolley adjacent the lower end thereof, a track arrangement for each chain, said track arrangement having a horizontal divider wall with a portion of the chain being above the divider wall and a portion of the chain being below the divider wall, and each trolley being supported by the divider wall of its associated track arrangement.

4. A vehicle in accordance with claim 1 including horizontally reciprocal plungers at the opposite ends of said bulkhead for selective contact with the trolley adjacent the associated end of the bulkhead to selectively facilitate pushing of the bulkhead by said trolleys.

5. A vehicle in accordance with claim 4 including a V-shaped notch on each plunger, the front edge of each trolley being shaped to mate with the notch on each plunger.

6. A vehicle in accordance with claim 1 including means to facilitate coupling said trolleys to a bulkhead while the bulkhead is outside said enclosure whereby all of the space within said enclosure may be utilized to transport compressed materials.

7. A vehicle for transporting compressible materials comprising an enclosure having a loading end, a bulkhead positionable transversely across said enclosure, means to facilitate securing the bulkhead at various locations in said enclosure, a pair of wheeled trolleys for moving opposite ends of said bulkhead longitudinally along the enclosure, means for moving the trolleys in synchronization, and stabilizing means associated with each trolley for stabilizing the trolleys in a vertical disposition, said trolleys being discrete and free from any transversely extending members for interconnecting the trolleys.

8. A vehicle in accordance with claim 7 wherein said stabilizing means includes a separate pair of cables associated with each trolley, at least two discrete pulleys on each trolley in contact with each cable, each cable extending longitudinally at the enclosure from a location adjacent the top wall at one end of the enclosure to a location adjacent the bottom wall of the opposite end of the enclosure.

9. A vehicle in accordance with claim 7 wherein said bulkhead is provided with a pair of plungers at each end thereof, each plunger being reciprocably guided by said bulkhead, each plunger being extendable to a position for contact with a mating surface on one of said trolleys to selectively facilitate movement of the bulkhead by said trolleys.

10. A vehicle in accordance with claim 7 including upper and lower tracks for each trolley adjacent the locations where the side walls meet the floor and roof of the enclosure, said stabilizing means including cables in each track and extending through the associated trolleys, and each trolley having guide tubes for the cables extending therethrough with a pulley adjacent each end of each guide tube.

* * * * *